UNITED STATES PATENT OFFICE.

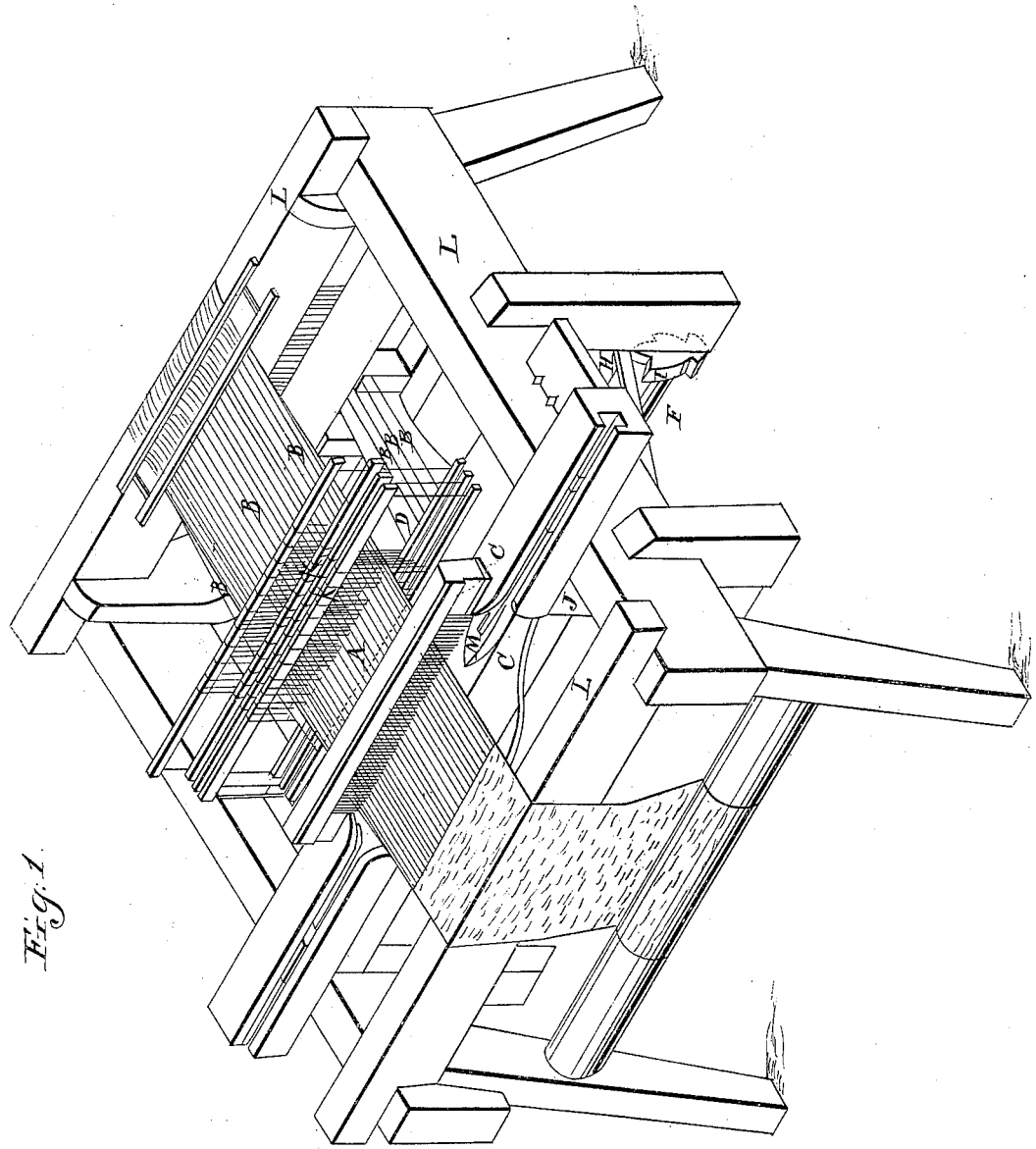

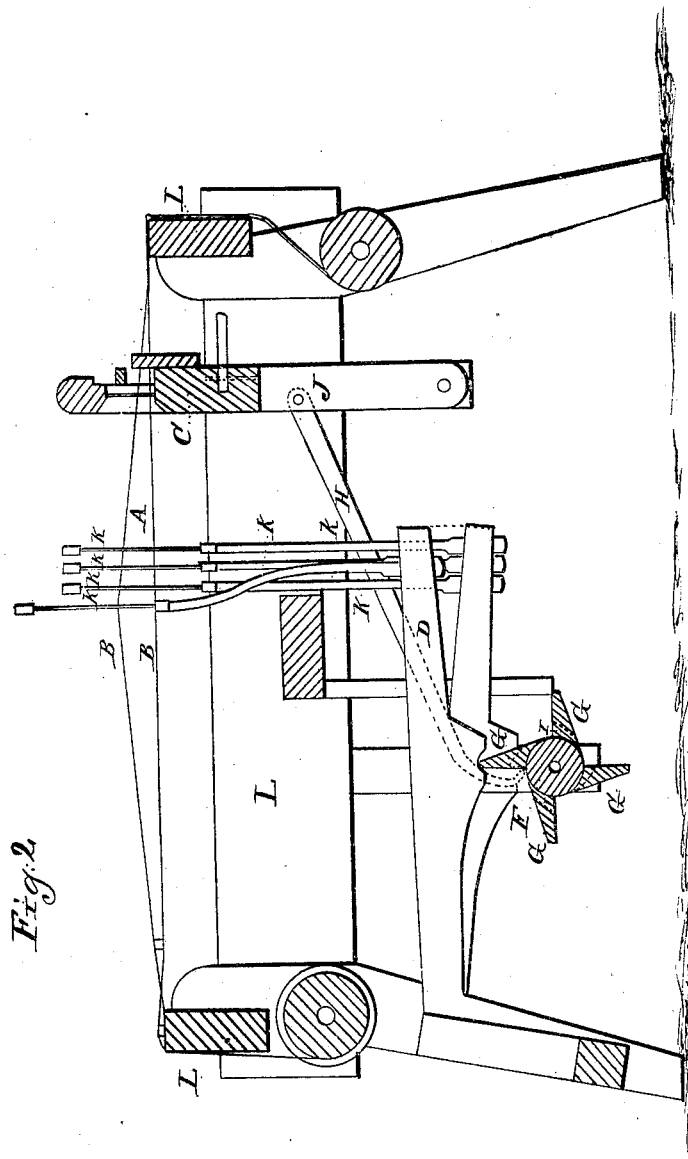

JOHN W. HAYSE, OF SALEM, IOWA, ASSIGNOR TO HIMSELF, WM. M. GORDON, AND LEVI J. RODGERS, OF SAME PLACE.

IMPROVEMENT IN HAND-LOOMS.

Specification forming part of Letters Patent No. 49,589, dated August 22, 1865.

*To all whom it may concern:*

Be it known that I, JOHN W. HAYSE, of Salem, in the county of Henry and State of Iowa, have invented a new and useful Improvement in Hand-Looms; and I do hereby declare the following to be a full, clear, and exact description of the same, reference being had to the accompanying drawings, making part of this specification, in which—

Figure 1 is a perspective view of a hand-loom embodying my improvements. Fig. 2 is a vertical central section of the same.

Similar letters of reference denote corresponding parts in the two figures.

This invention relates to a novel combination and arrangement of devices which I have designed with a view to increase the efficiency of hand-looms, and at the same time simplify their construction and reduce the cost of manufacture.

The following description will enable others skilled in the art to which my invention appertains to fully understand and use the same.

In the accompanying drawings, L represents the main frame of a hand-loom, which supports the shuttle, harness, batten, and other operating parts. The batten C is vibrated by hand, and it is provided with a suitable automatic device for throwing the shuttle M across the warp-thread during the backward motion of the batten. The shed is made during the forward motion of the batten. Hence the warp is crossed at or near the time the sley strikes the cloth, and the woof or filling is held firmly by the crossed threads of the warp, and so on at every backward and forward motion of the batten.

The pivoted arm J is attached to and moves with the batten C, and to said arm J is pivoted a rod, H, the loose end of which is hooked so as to take into the teeth of a ratchet-wheel, I. This latter is keyed upon a horizontal shaft, F, journaled in the supports of the frame L, so that it may have a rotary movement imparted to it. This rotation of the shaft F is effected by the hooked rod H, which acts upon one of the teeth of the ratchet-wheel I at each forward movement of the batten.

G G represent a series of arms or projections secured upon and sharing the motion of the shaft F, which is due to the vibration of the batten C, as described. Each of these projections G is arranged to operate in connection with one of the treadles, D, which latter are employed to transmit the requisite motion to the harness K. Four treadles are used in the loom represented, and at each forward motion of the batten the shaft F is turned one-fourth round, one treadle being raised at each movement of the shaft by the projections G coming in contact therewith, as represented by the sectional view, Fig. 2.

The upright rods carrying the harness are changeable on the treadles D, so that the twill or style of the cloth may be changed when desired.

Having now described my invention, what I claim as new, and desire to secure by Letters Patent, is—

The combination of the batten C, hooked arm H, shaft F, arms or projections G G, treadles D, and harness K, when constructed, arranged, and operating in the manner and for the purpose herein shown and described.

JOHN W. HAYSE.

In presence of—
A. J. WITHROW,
C. A. DUNHAM.